3,595,829
POLYAMIDES
Geoffrey Spencer Davy, Manchester, England, assignor to Imperial Chemical Industries Limited, London, England
No Drawing. Filed July 29, 1968, Ser. No. 748,212
Claims priority, application Great Britain, Mar. 11, 1968, 11,769/68
Int. Cl. C08g 51/60
U.S. Cl. 260—45.8          9 Claims

ABSTRACT OF THE DISCLOSURE

Synthetic linear polyamides are stabilised against the degradative effects of heat by incorporating therewith a stabilising composition, devoid of copper and copper salts, and comprising a mixture of a diphenylamine substituted in each of the positions para to the amino group by an alkyl, cycloalkyl or aralkyl group with a phosphorus acid of the general formula

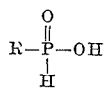

in which R represents a hydrogen atom, or an alkyl, cycloalkyl, aralkyl, aryl or hydroxyl group, or with a salt or ester of a said acid.

---

This invention relates to synthetic linear polyamides and to their stabilisation against the degradative effects of high temperature.

By synthetic linear polyamides we mean condensation polymers obtained by the polycondensation of aminocarboxylic acids or of mixtures of diamines with dicarboxylic acids, including interpolyamides obtained by the polycondensation of mixtures of different polyamide forming components. More particularly we mean the class of polyamides known generically as nylons of which polyhexamethylene adipamide and polycaprolactam are familiar examples.

It has long been known that synthetic linear polyamides are liable to degradation when exposed to high temperatures especially in the presence of the oxygen of the air. Thus the polymer may become brittle on such exposure and may suffer discolouration, the latter being particularly disadvantageous when the polymer is converted into yarn for textile use. Exposure to high temperatures may be a feature of the particular end use to which the polyamide is put. More importantly, the conversion of the polyamide into an article of commerce, for example a woven or knitted textile material, may itself involve exposure of the polymer to high temperature. Thus woven or knitted polyamide textiles are frequently heat set in order to stabilise the dimensions and shape of the article so that it is not distorted during subsequent processing, for example in dyeing.

It is already known to incorporate various copper compounds in synthetic linear polyamides in order to improve the stability to heat. It is also known to improve stabilising effect of the copper compound by adding to it various co-stabilisers, especially halide compounds such as potassium iodide. It has also been proposed to still further enhance the stabilising effect of a mixture of a copper compound with a costabiliser, such as a halide, by incorporating in the polyamide, together with these compounds, an inorganic acid of phosphorus or a salt thereof, for example phosphorus acid. The use of copper compounds for heat stabilisation is, however, attended by certain disadvantages. Thus when the polyamide containing the copper compound is converted into filaments by melting and extruding through spinerettes, the metal equipment used tends to become plated with a coating of copper. Provided the equipment is always used for polyamides containing a copper compound with a co-stabiliser this may not be a serious disadvantage, but if the equipment is subsequently used, as it is frequently required to be, for spinning polyamides not containing a co-stabiliser for the copper compounds, the polyamide picks up copper from the equipment, and, in the absence of a co-stabiliser, acquires a pink discolouration which is a very serious disadvantage. Moreover when polyamides, particularly in the form of textile material, which contain a copper compound and a co-stabiliser are scoured, there is a tendency for the co-stabiliser to be washed out of the polyamide, and the remaining copper compound by itself is then no longer effective as a heat-stabiliser.

We have now found a combination of stabilisers for polyamides which is at least equal in its heat stabilising effect to the combination of a copper compound with a co-stabiliser but which, because it is devoid of copper compounds, is free from the disadvantages associated with polyamide stabilisers containing copper. Our combination of stabilisers is a mixture of one of certain substituted derivatives of diphenylamine with one of certain phosphorus acids or a derivative thereof. Some of the diphenylamine derivatives which we use are known as amine type antioxidants for use in rubber. There have been one or two previous proposals to use amine type rubber antioxidants as stabilisers for polyamides, but such antioxidants have never previously been successful, particularly for polyamides to be used for textile purposes, because they cause discolouration of the polyamide particularly on exposure to sunlight and on bleaching. It has also been proposed to use certain amine type antioxidants as co-stabilisers for use with copper compounds in the heat stabilisation of polyamides, possibly in combination with other compounds. In particular there has been a suggestion that an oxy acid of phosphorus may be used in combination with a copper compound and an amine type antioxidant. These proposed combinations of stabilisers which contain copper, however, suffer from the disadvantages, already outlined, of all stabiliser systems containing copper. Moreover, the particular stabiliser combination of our invention unlike amine antioxidants used by themselves, show little or no discolouration of the polyamide, and, surprisingly, the stabilising effect of the combination is greater than that achieved by either of the components used separately, in other words the components have a synergistic interaction on each other.

Our invention provides a synthetic linear polyamide stabilised against the degradative effects of heat by incorporation therewith of a stabilising amount of a stabilising composition, devoid of copper and copper salts, and comprising a mixture of
(1) A diphenylamine substituted in each of the positions para to the amino group by an alkyl, cycloalkyl or aralkyl group, with
(2) A phosphorus acid of the general formula

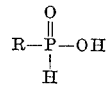

in which R represents a hydrogen atom, or an alkyl, cycoalkyl, aralkyl, aryl or hydroxyl group, or a salt or ester of a said acid.

The proportions of the substituted diphenylamine and the phosphorus compound in the mixture may usually vary between about equal parts by weight up to about 10 parts of the diphenylamine to each part of the phosphorus compound. By a stabilising amount we mean an amount sufficient to achieve a stabilising effect, but the amount which would normally be employed varies between about 0.05% and 5% calculated on the weight of the polyamide.

Preferred substituted diphenylamines which may be used in the stabilising compositions of our invention are those having the general formula

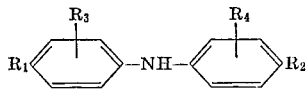

in which $R_1$ and $R_2$ represent alkyl, cycloalkyl, or aralkyl groups having up to 12 carbon atoms, and may be the same or different, and $R_3$ and $R_4$ represent hydrogen atoms, or alkyl, cycloalkyl or aralkyl groups having up to 12 carbon atoms, and may be the same or different. We particularly prefer that the groups represented by $R_1$ and $R_2$ are groups which are joined to the diphenylamine residue through a carbon atom of the group which is a saturated tertiary carbon atom. As examples of such groups there may be mentioned t-butyl, t-octyl (1,1,3,3-tetramethylbutyl), $\alpha,\alpha$-dimethylbenzyl and $\alpha$-methylcyclohexyl. As examples of other alkyl, cycloalkyl and aralkyl groups which $R_1$ and $R_2$ may represent there may be mentioned methyl, ethyl, n-propyl, isopropyl, n-butyl, sec-butyl, iso-butyl, amyl, hexyl, octyl, decyl, dodecyl, cyclopentyl, cyclohexyl, methyl cyclopentyl, methylcyclohexyl, benzyl, $\alpha$-methylbenzyl and phenylethyl. The groups represented by $R_3$ and $R_4$ are preferably hydrogen atoms or lower alkyl groups, that is alkyl groups having from 1 to 4 carbon atoms, but may be any of the groups which $R_1$ and $R_2$ may represent. As specific examples of the substituted diphenylamines there may be mentioned 4,4'-bis(1,1,3,3-tetramethylbutyl) diphenylamine, 2,2'-dimethyl-4,4'-di-t-butyl diphenylamine, 3,3'-dimethyl-4,4'-di-(1,1,3,3-tetramethylbutyl)diphenylamine, 4,4' - bis - ($\alpha,\alpha$-dimethylbenzyl)diphenylamine, 2,2' - di($\alpha$ - methylbenzyl)-4,4'-di-t-butyldiphenylamine and 4,4'-di-($\alpha$-methylcyclohexyl)diphenylamine.

The phosphorus acid used in the stabilising compositions of our invention has the formula

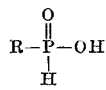

where R has the significance indicated above. Where R represents a hydrogen atom the compound is a hypophosphorus acid, where it represents an hydroxyl group the compound is phosphorous acid; and where it represents an alkyl, cycloalkyl, aralkyl or aryl group the compound is a phosphonous acid and it is then preferred that the group contains up to 12 carbon atoms. The phosphorus compound may also be a salt or an ester of such a phosphorus acid. The salt may be an inorganic salt such as an alkali metal salt or an ammonium salt, or it may be a salt with an organic base. Esters of such phosphorus acids may have the general formula

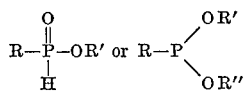

in which R has the same significance as hereinbefore and R' and R", which may be the same or different, represent alkyl, cycloalkyl, aralkyl or aryl groups, preferably containing up to 12 carbon atoms, or, where the phosphorus acid is phosphorous acid, that is where R in the formula for the phosphorus acid represents a hydroxyl group; may have one of the general formulae

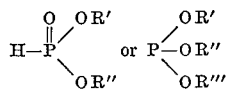

in which R', R" and R''', which may be the same or different, represent alkyl, cycloalkyl, aralkyl or aryl groups, preferably containing up to 12 carbon atoms. In the case of a compound represented by any of the above four formulae for esters, R and R' taken together or R' and R" taken together may represent a bivalent radical, especially an alkylene, alkylidene, cycloalkylene, aralkylene, aralkylidene or arylene radical which, together with the phosphorus atom and one or more oxygen atoms, forms a ring containing phosphorus, oxygen and carbon atoms, and the ester is then a cyclic ester. As examples of the alkyl, cycloalkyl, aralkyl and aryl groups which R, R', R" and R''' may represent there may be mentioned methyl, ethyl, n-propyl, isopropyl, n-butyl, sec-butyl, isobutyl, t-butyl, amyl, hexyl, octyl, decyl, dodecyl, cyclopentyl, methylcyclopentyl, cyclohexyl, methylcyclohexyl, benzyl, phenylethyl, phenyl, tolyl, xylyl, naphthyl and methylnaphthyl. As specific examples of the phosphorus acids and their salts and esters there may be mentioned hypophosphorous acid, phosphorous acid, sodium hypophosphite, hexamethylenediamine phosphite, cyclohexylphosphonous acid, phenylphosphonous acid, sodium phenylphosphonite, dioctyl phosphite, dicyclohexyl phosphite, triphenyl phosphite, didodecyl phenylphosphonite, and 4-hydroxybutanephosphonous acid phostone represented by the formula

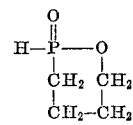

Various methods are available for incorporating the stabilising composition with the polyamide. The stabilising composition may be incorporated as a mixture of its components or the components may be added separately provided both the essential ingredients are present together in the polyamide. The components may be incorporated with the polyamide after the polycondensation step. Thus they may be added to the molten polyamide. Alternatively, they may be mixed with the solid polyamide, or the solid polyamide in the form of lumps or "chip" may be coated with the ingredients and the polyamide then melted. On the other hand the components may be added to the polyamide-forming ingredients before the polycondensation step or may be added at some stage during the polycondensation process, and the polycondensation completed by heating. The components may if desired be added at completely different times. Instead of a single substituted diphenylamine a mixture of such compounds may be used, and similarly a mixture of phosphorus compounds may be used instead of a single phosphorus compound.

The substituted diphenylamine may be used in amounts up to 5% by weight of the polyamide but preferred amounts range from 0.05% up to 3%. The phosphorus compound is usually used in amounts of from 0.01% to 2% by weight of the polyamide.

The stabilising composition of our invention is devoid of copper and copper compounds, and this means that the polyamide must not contain any added copper or copper compounds. However, it is possible for polyamides to contain trace amounts of copper as impurity. For the purpose of this invention adventitious trace amounts of copper, present in amounts of up to about, say, 2 parts per million of polyamide, may be ignored since they have no significant effect, adverse or otherwise, on the properties of the polyamides, and polyamides containing a stabilising composition of the invention and such trace amounts of copper are to be regarded as coming within the scope of the invention.

The stabilised synthetic linear polyamides of our invention are particularly suitable for spinning, usually by a melt spinning technique, into filaments or fibres which are subsequently fashioned into textile articles, for example yarns or knitted or woven fabrics. As already mentioned, polyamide textiles may be heat set in order to stabilise the dimensions and shape of the article so that it is not distorted during subsequent processing. In particular polyamide textiles, especially fabrics, which are to be dyed are heat set before dyeing in order to avoid distortion and creasing during the dyeing operation. Polyamide fabrics, for example, are heat set on a stenter. Exposure of polyamide textiles to heat, however, may result in some degradation of the polyamide. This degradation may manifest itself in a discolouration of the textile so that a white material appears less white. The degradation may also manifest itself, however, in a modification of the dyeing properties of the textile. The end groups of the polymer chains of the polyamide molecules are usually either carboxyl or amino groups. The proportions of these groups relative to each other and relative to the polymer as a whole influence the dyeing properties of the textile. In particular the dyeing properties with anionic dyestuffs are influenced by the proportion of amine end groups, and the affinity for anionic dyestuffs is reduced if the proportion of amine end groups is reduced. It is well known that exposure of polyamide textiles to high temperatures results in a reduction of the proportion of amine and groups, and causes a reduction in the affinity for anionic dyestuffs. However, in practice the effect is not obtained in a uniform manner, so that when fabrics which have been heat set are subsequently dyed with anionic dyestuffs, for example acid dyestuffs, it is frequently found that the fabric has a stripy appearance due to portions of the fabric having dyed to a deeper shade than others. It is believed that these stripes are caused by variations in the amine end group content of the polyamide forming the yarns from which the fabric is woven or knitted. When, however, the polyamide is one which contains a stabilising composition of our invention the stripy appearance of polyamide fabrics which have been heat set and then dyed with anionic dyestuffs is reduced or eliminated. Moreover, unlike some stabilising systems which have been proposed for reducing the stripy effect, the stabilising system of the invention has the advantage of remaining effective even if the fabric is scoured before heat setting. In addition, polyamides stabilised according to our invention may be whiter initially than polyamides not so stabilised and on exposure to high temperatures, for example during heat setting, they show less discolouration. Again, our stabilised polyamides show a smaller loss in the proportion of amine end groups on exposure to high temperatures.

The stabilising compositions of our invention have the advantage that they do not cause frothing when added to a mixture of polyamide-forming ingredients during the polycondensation step. Moreover, they are not steam-volatile to any serious extent, and this is an advantage when the composition is added to a polyamide-forming mixture containing water or in which water is generated, and from which water must be removed by volatilisation as steam, for example a partially condensed mixture from a dicarboxylic acid and a diamine.

The stabilised polyamides of the invention may contain other additives as well as the stabilising composition, for example viscosity stabilisers (e.g. acetic acid), delustrants (e.g. titanium dioxide) and light stabilisers (e.g. manganese compounds).

The invention is illustrated but not limited by the following example in which the parts and percentages are by weight.

EXAMPLE 1

5,240 parts of nylon 6.6 salt (hexamethylene diammonium adipate), 2,500 parts of distilled water, 22.7 parts of 26.4% aqueous acetic acid solution, 4.52 parts of 4,4'-bis (1,1,3,3-tetramethylbutyl)diphenylamine and 1.86 parts of sodium hypophosphite were heated in an autoclave to a temperature of about 215° C. and pressure of 250 lb. per square inch. The heating was continued and the pressure maintained at 250 lbs. per square inch by bleeding off steam. At a temperature of 220° C., 226 parts of a 40% aqueous dispersion of titanium dioxide in water was added via a lock. When a temperature of 240° C. was reached, the pressure was gradually reduced to atmospheric during 60 minutes after which time the temperature had risen to about 270° C. As soon as atmospheric pressure was reached a slow stream of nitrogen was passed through the autoclave. After 10 minutes agitation the polymer was extruded from the autoclave under nitrogen pressure as a ribbon and quenched with water. The polymer ribbon was then chipped. The polymer chips were melted and spun at 290° C. into a yarn of 9 filaments. Four strands were plied together and drawn and twisted to a total denier of 108. Yarn was also spun in the same way (a) from polymer chip made without any addition of 4,4'-bis(1,1,3,3 - tetramethylbutyl) diphenylamine or sodium hypophosphite, (b) from polymer chip made with 3.72 parts of sodium hypophosphite added before the polymerisation (c) from polymer chip made with 9.04 parts of 4,4'-bis(1,1,3,3-tetramethylbutyl)diphenylamine added before the polymerisation, and (d) from polymer chip made with .0708 part copper acetate and 1.986 parts hexamethylenediammonium iodide added before the polymerisation. The yarns were heated at 220° C. for 30 seconds. The b-chromaticity of the yarns was measured before and after heating using a Color master Mark 5 colorimeter. The amine end group concentration in the yarn was determined before and after heating by titration of a solution in phenol and methanol with N/20 hydrochloric acid. The results are given in the following table.

| Additives | b-Chromaticity | | | Percentage of amine end groups lost |
|---|---|---|---|---|
| | Before test | After test | Loss | |
| 4,4'-bis(1,1,3,3-tetramethyl-butyl)diphenylamine (0.1%) and sodium hypophosphite (0.041%) | .3224 | .3130 | .0094 | 14.7 |
| (a) None | .3165 | .2770 | .0395 | 55.2 |
| (b) Sodium hypophosphite (0.082%) | .3270 | .3020 | .0250 | 29.7 |
| (c) 4,4'-bis(1,1,3,3-tetramethylbutyl)diphenyl-amine (0.2%) | .3154 | .2981 | .0173 | 27.5 |
| (d) 5 p.p.m. copper (added as copper acetate) and 300 p.p.m. iodine (added as hexamethylenediammonium iodide) | .3147 | .2956 | .0191 | 27.8 |

The b-chromaticity is the ratio of the percent reflected blue light to the sum of the percent reflected blue, green and red light and is similar to the z trichromatic coefficient of the International Commission on Illumination System (Handbook of Colorimetry, A. C. Hardy, The Technology Press, Cambridge, Mass., U.S.A.).

EXAMPLE 2

A polymer was made from nylon 6.6 salt as described in Example 1 excepting that in place of 1.86 parts of sodium hypophosphite 6.42 parts of sodium phenyl phosphonite were added.

EXAMPLE 3

A polymer was made from nylon 6.6 salt as described in Example 1 excepting that in place of 4.52 parts of 4,4' - bis(1,1,3,3 - tetramethylbutyl)diphenylamine 4.52 parts of 4,4'-bis(α-methylcyclohexyl)diphenylamine were used and in place of 1.86 parts of sodium hypophosphite 12.0 parts of dioctyl phosphite were used.

EXAMPLE 4

A polymer was made from nylon 6.6 salt as described in Example 1 excepting that in place of 4.52 parts of 4,4' - bis(1,1,3,3 - tetramethylbutyl)diphenylamine 4.52 parts of 4,4'-bis(α-methylcyclohexyl)diphenylamine were used.

EXAMPLE 5

A polymer was made from nylon 6.6 salt as described in Example 1 excepting that in place of 4.52 parts of 4,4' - bis (1,1,3,3 - tetramethylbutyl)diphenylamine 4.52 parts of 4,4'-bis (α,α-dimethylbenzyl)diphenylamine were used.

Samples of the polymer chips obtained in Examples 2 to 5 were melt spun and the yarns tested as described in Example 1. The results of the tests are given in the following table.

| Example | Additives | b-Chromaticity | | | Percentage of amine end groups lost |
|---|---|---|---|---|---|
| | | Before test | After test | Loss | |
| 2 | 4,4'-bis(1,1,3,3,-tetramethylbutyl)diphenylamine (0.1%) and sodium phenyl phosphonite (0.142%). | .3191 | .3038 | .0153 | 19.5 |
| 3 | 4,4'-bis(α-methylcyclohexyl)diphenylamine (0.1%) and dioctyl phosphonite (0.266%). | .3222 | .3113 | .0109 | 18.0 |
| 4 | 4,4'-bis(α-methylcyclohexyl)diphenylamine (0.1%) and sodium hypophosphite (0.041%). | .3234 | .3079 | .0155 | 12.7 |
| 5 | 4,4'-bis(α,α-dimethylbenzyl)diphenylamine (0.1%) and sodium hypophosphite (0.041%). | .3256 | .3111 | .0145 | 16.1 |

EXAMPLE 6

This is a comparative example.

A polymer was made from nylon 6.6 salt as described in Example 1 except that the additives were those described in Example 9 of the table on page 4 of French patent specification No. 1,472,615, that is 0.7% by weight of 4,4'-bis(1,1,3,3-tetramethylbutyl) diphenylamine (p,p'-dioctyldiphenylamine), 0.0042% of sodium hypophosphite (monohydrate), 0.30% of potassium iodide and 0.0286% of cupric chloride (dihydrate) (107 parts per million of copper). The resulting polymer chip was melt spun into yarn as described in Example 1, and the yarn compared with the yarn of Example 1 by the test methods described in that example. The results were as follows.

| Example | Additives | Loss of b-chromaticity | Percent loss of amine end groups |
|---|---|---|---|
| 1 | 4,4'-bis(1,1,3,3-tetramethylbutyl) diphenylamine (0.1%). Sodium hypophosphite (monohydrate) (.050%). | 0.0094 | 14.7 |
| 6 | 4,4'-bis(1,1,3,3-tetramethylbutyl) diphenylamine (0.7%). Sodium hypophosphite (monohydrate) (0.0042%). Potassium iodide (0.3%). Cupric chloride (dihydrate) (0.0286%). | 0.0275 | 22.5 |

We claim:

1. A synthetic linear polyamide stabilised against the degradative effects of heat by incorporation therein of a stabilising amount of a stabilising composition, devoid of copper and copper salts, and comprising a mixture of
 (1) from 0.05% to 5% by weight, based on the weight of polyamide, a diphenylamine of the general formula

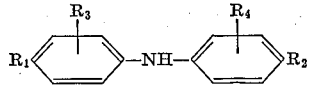

in which $R_1$ and $R_2$ represent alkyl, cycloalkyl, or aralkyl having up to 12 carbon atoms and $R_3$ and $R_4$ represent hydrogen or alkyl, cycloalkyl or aralkyl groups having up to 12 carbon atoms; with
 (2) from 0.01% to 2% by weight, based on the weight of polyamide of a phosphorus acid of the general formula

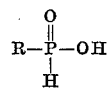

in which R represents hydrogen, hydroxyl or alkyl, cycloalkyl, aralkyl or aryl containing up to 12 carbon atoms or the alkali metal, ammonium or organic base salts thereof or esters thereof of the formula

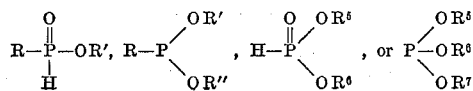

in which R has the meaning given above and R' and R'', represent alkyl, cycloalkyl, aralkyl or aryl groups containing up to 12 carbon atoms or in which R and R' taken together represent $(CH_2)_4$, and $R^5$, $R^6$ and $R^7$ represent alkyl, cycloalkyl, aralkyl or aryl groups containing up to 12 carbon atoms.

2. The polyamide of claim 1 comprising polyhexamethylene adipamide and incorporated therewith from 0.05% to 5% by weight of the said polyhexamethylene adipamide of a stabilising composition comprising a substituted diphenylamine selected from 4,4'-bis(1,1,3,3-tetramethylbutyl)diphenylamine, 2,2' - dimethyl-4,4'-di-t-butyl diphenylamine, 3,3'-dimethyl-4,4'-di-(1,1,3,3-tetramethylbutyl)diphenylamine, 4,4'-bis-(α,α-dimethylbenzyl) diphenylamine, 2,2'-di(α-methylbenzyl)-4,4'-di-t-butyldiphenylamine and 4,4'-di-(α-methylcyclohexyl)diphenylamine, and from 0.1 to 1 part by weight of the said substituted diphenylamine of a phosphorus compound selected from hypophosphorous acid, phosphorous acid, sodium hypophosphite, hexamethylenediamine phosphite, cyclohexylphosphonous acid, phenylphosphonous acid, sodium phenylphosphonite, dioctyl phosphite, dicyclohexyl phosphite, triphenyl phosphite, didodecyl phenylphosphonite, and 4-hydroxybutanephosphonous acid phostone represented by the formula

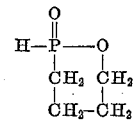

3. A polyamide as claimed in claim 2 in which, in the general formula for the substituted diphenylamine, $R_1$ and $R_2$ represent groups which are joined to the diphenylamine residue through a carbon atom of the group which is a saturated tertiary carbon atom.

4. The polyamide of claim 3 in which, the general formula for the substituted diphenylamine, $R_1$ and $R_2$ each represents a t-butyl, t-octyl, α,α-dimethylbenzyl or α-methylcyclohexyl group, and $R_3$ and $R_4$ each represents a hydrogen atom or a lower alkyl group.

5. The polyamide of claim 1 in which the phosphorus acid is hypophosphorus acid.

6. The polyamide of claim 1 in which the phosphorus acid is phosphorous acid.

7. The polymeric of claim 1 in which the phosphorus acid is a phosphonous acid.

8. The polyamide of claim 1 in which the phosphorus compound is a phosphorus acid ester of the general formula

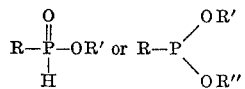

in which R has the meaning given in claim 1 and R' and R'', represent alkyl, cycloalkyl, aralkyl or aryl groups containing up to 12 carbon atoms or in which R and R' taken together represent $(CH_2)_4$.

9. The polyamide of claim 6 in which the phosphorus compound is a phosphorous acid ester of the general formula

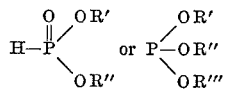

in which R', R'' and R''' represent alkyl, cycloalkyl, aralkyl or aryl groups containing up to 12 carbon atoms.

References Cited
UNITED STATES PATENTS

| | | | |
|---|---|---|---|
| 2,493,597 | 1/1950 | Rothrock | 260—45.7 |
| 2,510,577 | 6/1950 | Gray | 260—45.7 |
| 2,630,421 | 3/1953 | Stamatoff | 260—45.7 |
| 3,384,615 | 5/1968 | Agoori | 260—45.9 |
| 3,425,985 | 2/1969 | Freytag et al. | 260—45.9 |
| 3,428,597 | 2/1969 | Dikotter et al. | 260—45.9 |
| 3,452,056 | 6/1969 | Sundholm | 260—45.9 |

HOSEA E. TAYLOR, Primary Examiner.

U.S. Cl. X.R.

1—45.9; 260—45.7